US011687585B2

(12) United States Patent
Waye et al.

(10) Patent No.: US 11,687,585 B2
(45) Date of Patent: Jun. 27, 2023

(54) SYSTEMS AND METHODS FOR IDENTIFYING A MEDIA ASSET FROM AN AMBIGUOUS AUDIO INDICATOR

(71) Applicant: Rovi Guides, Inc., San Jose, CA (US)

(72) Inventors: Lucas Waye, Cambridge, MA (US); Theresa Tokesky, Boston, MA (US); Michael A. Montalto, South Hamilton, MA (US); Kanagasabai Sivanadian, Natick, MA (US)

(73) Assignee: Rovi Guides, Inc., San Jose, CA (US)

( * ) Notice: Subject to any disclaimer, the term of this patent is extended or adjusted under 35 U.S.C. 154(b) by 251 days.

(21) Appl. No.: 17/081,097

(22) Filed: Oct. 27, 2020

(65) Prior Publication Data
US 2021/0224316 A1 Jul. 22, 2021

Related U.S. Application Data

(63) Continuation of application No. 15/947,345, filed on Apr. 6, 2018, now Pat. No. 10,853,411.

(51) Int. Cl.
| G06F 16/632 | (2019.01) |
| H04N 21/472 | (2011.01) |
| G06F 16/435 | (2019.01) |
| G06F 16/487 | (2019.01) |
| G06F 16/9537 | (2019.01) |
| G06F 16/903 | (2019.01) |
| G06Q 50/00 | (2012.01) |

(52) U.S. Cl.
CPC .......... *G06F 16/634* (2019.01); *G06F 16/435* (2019.01); *G06F 16/487* (2019.01); *G06F 16/90335* (2019.01); *G06F 16/9537* (2019.01); *H04N 21/47202* (2013.01); *G06Q 50/01* (2013.01)

(58) Field of Classification Search
CPC ............. H04N 21/251; H04N 21/6582; H04N 21/25891; H04N 21/4394; H04N 21/4826; H04N 21/45202; H04N 21/25841; H04N 21/44204; H04N 21/8113; H04N 21/42203; G06F 16/634
See application file for complete search history.

(56) References Cited

U.S. PATENT DOCUMENTS

| 2004/0117272 A1* | 6/2004 | Shehab .................. G06Q 30/06 705/27.1 |
| 2006/0095323 A1* | 5/2006 | Muranami .......... G06Q 30/0273 705/14.69 |
| 2010/0106662 A1* | 4/2010 | Ramaswamy ......... G01C 21/20 705/323 |

(Continued)

*Primary Examiner* — Etienne P Leroux
(74) *Attorney, Agent, or Firm* — Haley Guiliano LLP

(57) ABSTRACT

Systems and methods are disclosed herein for identifying a media asset in response to an ambiguous input. The media guidance application may detect a portion of music provided by a user, e.g., a melody from user humming. The media guidance application may retrieve information about the user's location for a predetermined time period prior to detecting the portion of music. The media guidance application may then determine content accessible by the user at the location, e.g., a commercial played at a display screen at a train station when the user was waiting for the train, to identify the media asset corresponding to the user humming.

14 Claims, 10 Drawing Sheets

(56) References Cited

U.S. PATENT DOCUMENTS

| | | | |
|---|---|---|---|
| 2014/0373036 A1* | 12/2014 | Phillips | H04N 21/6582 |
| | | | 725/12 |
| 2016/0044151 A1* | 2/2016 | Shoemaker | H04M 19/02 |
| | | | 455/556.1 |
| 2016/0260437 A1* | 9/2016 | Motta | H04N 21/8358 |
| 2019/0281345 A1* | 9/2019 | Jamadagni | H04L 67/306 |

* cited by examiner

US 11,687,585 B2

SYSTEMS AND METHODS FOR IDENTIFYING A MEDIA ASSET FROM AN AMBIGUOUS AUDIO INDICATOR

CROSS-REFERENCE TO RELATED APPLICATION

This application is a continuation of U.S. patent application Ser. No. 15/947,345, filed Apr. 6, 2018, which is hereby incorporated by reference herein its entirety.

BACKGROUND

Some existing media systems may perform an audio search to identify a media asset. Conventionally, some media systems may capture a music tune that is played in the environment, and identify the name of a song corresponding to the music tune. The music search performed by conventional systems, however, requires that (1) the input of the audio search, i.e., usually a segment of the music tune, is well-identifiable and of high quality; and (2) the music to be identified is stored as a music item at a music database. For example, when a user is at a record store, and uses his or her user device to record a segment of the music being played from the audio speaker, the media system may be able to perform the audio search by comparing characteristics of the recorded segment and characteristics of a stored segment of music to identify what song was being played. When the audio search indicator is ambiguous, e.g., a user humming a music tune that may be inaccurate with the original music tune, or when the music tune is not pre-stored in the music database as a music item, e.g., an impromptu melody sung by a character in the television show, conventional media systems are unable to identify what the media asset it is. In addition, the music search performed by the existing media systems is often oblivious of any use-specific preference or background information, and may not identify a version of the music or media asset that the user prefers.

SUMMARY

The advancement of digital transmission of media content has increased the amount of data that can be transmitted. For example, high definition media assets usually involve a large volume of video data to be delivered from a media source to user equipment for display. In particular, media systems may transmit metadata that includes detailed information about media content. This metadata may include descriptions and tags to important events within the media asset. While this information, by itself, is not useable for displaying to a human user, computer processors can read and interpret this information. However, while computer processors may read and interpret this information, and generate media content for display that may be useable by a human user (e.g., output media content to match with a captured music tune), these systems still fail to solve the aforementioned problem when implemented in computer systems because: (i) as discussed above, these computer systems can only perform audio search of a music tune when the music tune is of high quality; and (ii) even if a user can theoretically listen to media assets stored in a database, and mentally decide whether the media asset the user is listening to is a match that the user was trying to find, given the volume of media assets stored in a media asset database, it is impractical and basically impossible for a user to manually identify a media asset based on an input of music tune.

Accordingly, to overcome the problems created when performing audio search to identify a music tune, systems and methods are disclosed herein for identifying a media asset based on an ambiguous search indicator provided by a user.

Specifically, the media guidance application may detect a portion of music provided by a user, e.g., a melody from user humming. The media guidance application may retrieve information about the user's location for a predetermined time period prior to detecting the portion of music. The media guidance application may then identify a source of media available at the user's location for the predetermined time period, and determine content accessible from the source of media, e.g., a commercial played at a display screen at a train station when the user was waiting for the train. The media guidance application may compare the portion of music to the content to identify a media asset having a characteristic associated with the portion of music.

The media guidance application may capture, at a first time instance, from the environment where the user is present, an audio recording, and may identify, from the audio recording, a tune having audio characteristics that match with vocal characteristics of the user. For example, the media guidance application may extract a set of mono signals from the audio recording. For each mono signal from the set of mono signals, the media guidance application may generate a set of audio characteristics corresponding to the mono signal. The media guidance application may then retrieve, from the profile of the user, a set of vocal characteristics corresponding to the user. The media guidance application may compare each characteristic of the set of audio characteristics with a corresponding characteristic from the set of vocal characteristics of the same type.

In response to identifying the tune, the media guidance application may generate a frequency domain representation of the tune including a plurality of tones. For example, the mono audio signal may be transformed, via Fourier transform, to a frequency domain representation.

The media guidance application may transmit a query based on the generated frequency domain representation to a music database. For example, the media guidance application may generate an audio signature based on the frequency domain representation of the tune, and send the audio signature to the music database storing audio signatures of different media assets. In response to the query, the media guidance application may receive a result indicating an identified media asset. Or the media guidance application may receive an indication of a failure to find a match in the music database based on the generated frequency domain representation.

In response to receiving no result by database search, the media guidance application may retrieve, from a profile of the user, a location history of the user and an application usage history corresponding to the user within a pre-defined duration of time prior to the first time instance. In some embodiments, the media guidance application may transmit a query to a device of the user for a GPS log and an application usage log within the pre-defined duration of time prior to the first time instance.

In some embodiments, when the location history is not available from the device of the user, the media guidance application may transmit, to a server, a query for a record of social media activities relating to the user within the pre-defined duration prior to the first time instance. In response to the query for the record of social media activities, the media guidance application may search the record of social media activities relating to the user for a first subset of social media activities, in which each social media activity from the subset identifying a location. For example, the media guidance application may retrieve social media posts relating to the user within the past 12 hours, and identify social media posts showing the user "check-in" at a location. The media guidance application may then store the first subset of social media activities and corresponding locations as part of the location history.

In some embodiments, in response to receiving a notification that the application usage history is unavailable from the device of the user, the media guidance application may search the record of social media activities relating to the user for a second subset of social media activities. Each social media activity from the second subset indicates that the user is using a respective application. For example, when the user was playing a video game via a gaming application on the user device, the gaming application may generate and post a social media status as "Jane Doe is playing Super Candy" on social media. The media guidance application may then store the second subset of social media activities and information relating to respective applications as part of the application usage history.

In some embodiments, the media guidance application may identify, from a location history, a plurality of locations that the user has been present at during the pre-defined duration of time. The media guidance application may then determine a first subset of the plurality of locations for locations that the user was present at for more than a threshold amount of time. For each location from the first subset, the media guidance application may query a location database for information relating to media availability at the location. For example, the media guidance application may retrieve information from the location database that the location of "science club" has access to a number of broadcast television channels.

In some embodiments, the media guidance application may determine a type of the respective location. In response to determining that the respective location is of a type that is likely to provide media transmission to the user, e.g., an indoor venue, the media guidance application may identify the respective location as a candidate for the first location. In response to determining that the respective location is of a type that is unlikely to provide media transmission to the user, e.g., an outdoor venue, the media guidance application may search the application usage history for an application usage record corresponding to a respective time period when the user was present at the respective location, and determine whether the application usage record relates to media content delivery. For example, the media guidance application may determine whether the user has used an application running on the device of the user to access media content, e.g., listening to digital radio programs while on a hiking trail.

In some embodiments, the media guidance application may determine what media source is available at a location where the user was present based on past activity pattern of the user. Specifically, the media guidance application may transmit, to a server, a query for a record of social media activities relating to the user within a past period of time. In response to obtaining the record of social media activities relating to the user, the media guidance application may search the record of social media activities for a subset of social media activities that occurred at the first location. The media guidance application may then search a past transmission schedule across a plurality of media sources at a respective time corresponding to the respective social media activity based on the one or more keywords. For example, the media guidance application may determine that the user has a pattern of watching a media asset at the location. Thus, in response to identifying a media asset from a media source from the past transmission schedule matches the one or more keywords, the media guidance application may determine that the media source, e.g., the television channel on which the media asset is aired, is available at the first location.

Upon determining the source of the media asset available at the first location during the first period of time, the media guidance application may determine whether the user was paying attention to the media asset displayed at the location when the user was present at the location.

In some embodiments, the media guidance application may utilize the application usage history to determine whether the user was distracted, e.g., playing video games on the user device, attending a phone call, etc. Specifically, the media guidance application may retrieve content of a first media asset transmitted from the source of media asset during the first period of time, and determine whether the user was exposed to the retrieved content of the media asset based at least in part on user application usage history from a user device. The media guidance application may search the application usage history for one or more application usage records corresponding to the first period of time when the user was present at the first location. The media guidance application may determine an application type, an application usage status and an application usage time duration for each of the one or more application usage records. The media guidance application may then search, an application usage table, for a distraction score corresponding to each application type. For example, the distraction score is a numeric value indicative of a degree that the user is distracted from other activities.

In some embodiments, the media guidance application may compute a distraction metric based on the distraction score corresponding to each application type, the respective application usage status and the respective application usage time duration. For example, the distraction metric is computed as a weighted sum of the respective distraction scores of all applications that have been accessed during the time when the user was present at the location and each distraction score is weighted by a percentage of time duration that the application is in use as compared to the entire duration when the user was present at the location. In response to determining that the user was exposed to the retrieved content of the first media asset, the media guidance application may proceed to determine whether the media asset the user has been exposed to contains the user humming.

Specifically, the media guidance application may determine a first plurality of music tunes transmitted with the content of the first media asset. For example, the media guidance application may generate an audio signature of the theme song indicated in the metadata. In response to determining that the metadata includes no information relating to any theme song, the media guidance application may perform audio analysis of the first media asset to generate the plurality of music tunes. The media guidance application may then identify whether the user humming corresponds to any of the music tunes from the media assets.

The media guidance application may then generate for display a recommendation of the first media asset featuring the respective music tune. In some embodiments, the media guidance application may include social influence from another user in searching for a media asset to match with the user humming. For example, the media guidance application may determine whether a social connection of the user has been co-located at a same location with the user during the pre-defined duration of time based on the location history of the user and a social media activity at the same location. In response to determining that the social connection of the user has been co-located at the same location with the user, the media guidance application may obtain, from a server, a location history of the social connection and an application usage history of the social connection prior to a time when the social connection and the user were co-located at the same location. For example, the media guidance application may determine a second media asset that the social connection was exposed to based on the location history of the social connection and the application usage history of the social connection, and then determine whether the user humming may correspond to any music tune featured in the second media asset.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
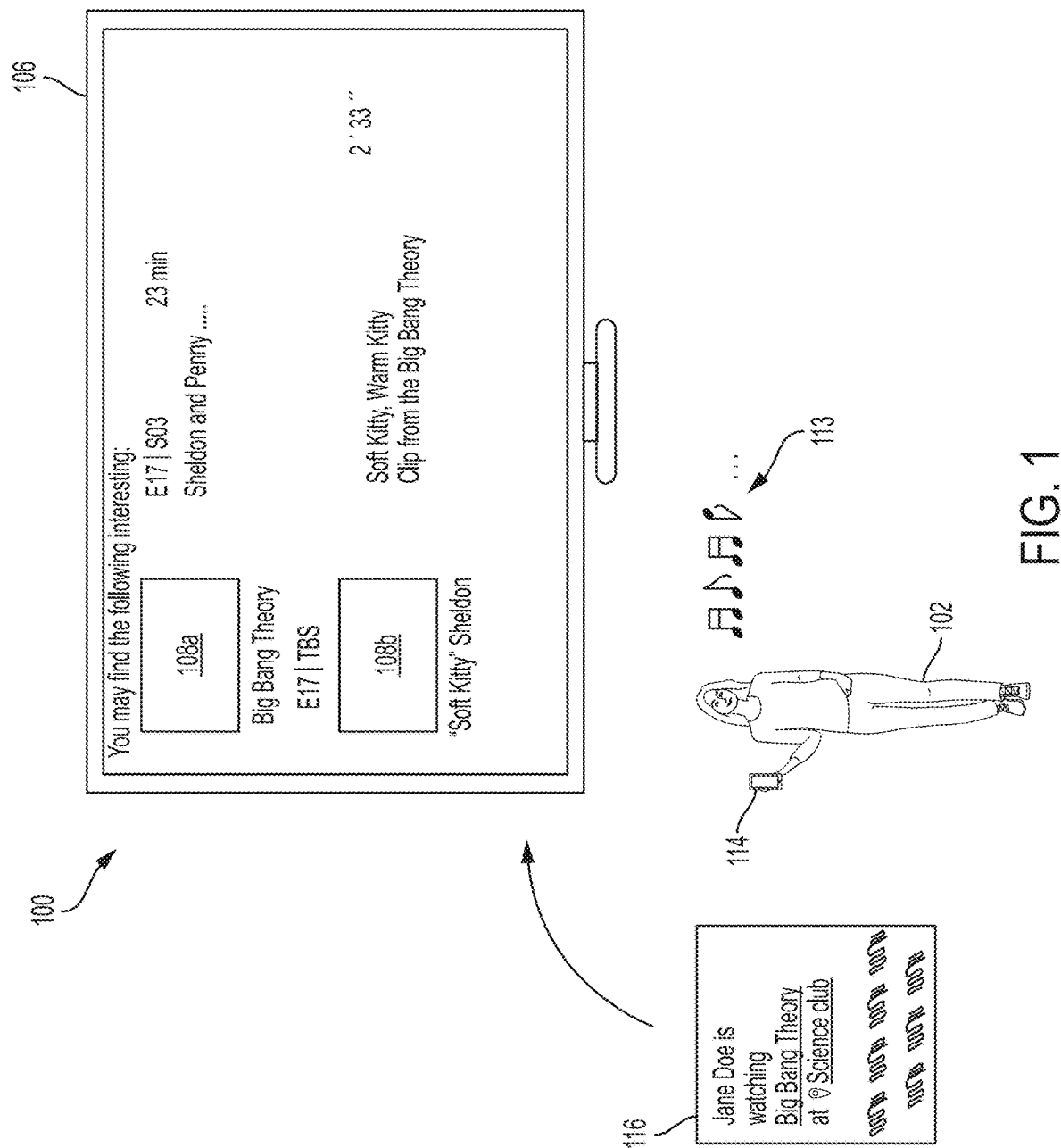
FIG. 1 depicts an illustrative example diagram for identifying a media asset in response to an ambiguous search indicator such as user humming, in accordance with some embodiments of the disclosure.

Systems and methods are disclosed herein for identifying a media asset based on an ambiguous search indicator provided by a user. Specifically, a media guidance application, which is implemented at a set-top box of user equipment, may be used to engage an audio capturing device (e.g., a microphone, etc.) to capture an audio recording from the environment where the user is present. The media guidance application may detect a portion of music provided by a user from the audio recording, e.g., by user humming a melody. The media guidance application may then identify which media asset the melody the user was humming belongs to, based on recent activities of the user, and media assets the user has been recently exposed to.

For example, the media guidance application may capture the user humming a segment of music, which is a melody of "soft kitty" sung by a character of the television show "the Big Bang Theory." The user may only remember a few syllabuses of the beginning of the song, and the humming may be inaccurate. Also, the melody of "soft kitty" may not be stored at a music database as a stand-alone music item. Thus, by a direct audio search of comparing tones and audio signature of previously stored music, the media guidance application may not be able to identify what music the user is humming or which media asset the melody belongs to. Instead, the media guidance application may determine what media assets the user may have been recently exposed to, to enhance the audio search. For instance, the media guidance application may retrieve a viewing history of the user, e.g., from a profile of the user. The media guidance application may retrieve a location history of the user, and by determining where the user has been present at, the media guidance application may estimate what media asset the user may have been exposed to, based on a type of the location or activities that are likely to be held at the location. For instance, if the user has been to a science club on a university campus and has posted a social media status of "watching Big Bang Theory with buddies!", the media guidance application may correlate the user's exposure to the television show "the Big Bang Theory." Therefore, by comparing audio characteristics of the music tune hummed by the user with any background music feature in the television show, the media guidance application may identify whether the music tune is from the television show. The media guidance application may then find the episode where the melody is featured, and recommend the episode to the user.

For another example, the media guidance application may identify and recommend a media asset featuring a user preferred version of a music item to the user, by analyzing the media assets that the user have been recently exposed to. For instance, the user may hum a segment of a song "Someone like you." When the tune hummed by the user is sufficiently accurate, conventional media system may, at most, identify the tune corresponds to the song "Someone like you" by the artist "Adele." The media guidance application may instead, identify that the user has watched the television show American Idol featuring a contestant's performance with the background music of "Someone like you." Thus, the media guidance application may identify the episode of American Idol featuring the performance of "Someone like you," and recommend the episode to the user.

As referred to herein, the term "ambiguous" refers to an item that is unidentifiable with a clear interpretation. For example, an "ambiguous" search indicator may refer to a search indicator, e.g., in a textual, verbal, audio, video format, that leads to no search result at all, or a large amount of search results from which the most relevant search result cannot be identified.

As referred to herein, the term "tune" refers to a melody that characteristic a certain piece of music. As referred to herein, the term "tone" refers to a musical or vocal sound that is described by characteristics such as the pitch, the quality and the strength of the sound.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in VOD systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media cards, register memory, processor caches, Random Access Memory ("RAM"), etc.

It is to be noted that embodiments described herein may be implemented by a media guidance application implemented on a set-top box, or any other application that receives media guidance data and that can be configured to remotely communicate with a set-top box.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as online applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters" or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 depicts an illustrative example diagram 100 for identifying a media asset based on an ambiguous search indicator provided by a user by correlating media assets that the user has been recently exposed to, in accordance with some embodiments of the disclosure. Diagram 100 shows user equipment 106 that may include a step-top box, on which the media guidance application is implemented. The screen of user equipment 106 may display an interactive media guidance application, which may provide, e.g., recommendations of media assets 108*a-b* to the user.

Diagram 100 further shows a user 102 in proximity to the user equipment 106, and the user 102 may be optionally operating a user device 114. Specifically, the media guidance application may capture, at a first time instance, from the environment where the user 102 is present, an audio recording. For example, the media guidance application may periodically, intermittently or constantly record ambient background noise of the room where the user is present. In some implementations, an audio capturing device, which may be implemented with user equipment 106, may be used to capture the audio recording. In another implementation, a client component of the media guidance application running on the user device 114 may be used to capture the audio recording.

The media guidance application may identify, from the audio recording, a tune having audio characteristics that match with vocal characteristics of the user. For example, the media guidance application may extract a set of mono signals from the audio recording, e.g., by converting a plurality of audio signals from the audio recordings to the frequency domain via Fourier transform, and identifying mono signals among the frequency domain representation. For each mono signal from the set of mono signals, the media guidance application may generate a set of audio characteristics corresponding to the mono signal. For example, the set of audio characteristics includes any of mel-frequency cepstral coefficients (MFCC), perceptual linear prediction relative spectra (PLP-RASTA). For another example, the set of audio characteristics may include the spectrum range, strength, and/or the like. The media guidance application may then retrieve, from the profile of the user (e.g., from storage 608 in FIG. 6), a set of vocal characteristics, which may include the pitch, loudness, MFCC, PLP-RASTA, and/or the like. The media guidance application may compare each characteristic of the set of audio characteristics with a corresponding characteristic from the set of vocal characteristics of the same type.

For example, the media guidance application determines whether the MFCC of the mono signal and the stored MFCC of the user's voice are within a small range of difference (e.g., 3%, 5%, etc.). If the characteristics of the same kind are within the small rage of difference, the two characteristics are considered to be a match. The media guidance application may then determine whether the set of audio characteristics and the set of vocal characteristics overlap, e.g., match, for more than a similarity threshold (e.g., 65%, 68%, etc.). In response to determining that the set of audio characteristics and the set of vocal characteristics overlap for more than the similarity threshold, the media guidance application may identify the mono signal as a vocal signal from the user. For example, as shown in FIG. 1, the media guidance application may capture an audio including a melody 113 hummer by the user, and may then generate a mono audio signal representing the user humming 113.

In response to identifying the tune, the media guidance application may generate a frequency domain representation of the tune including a plurality of tones. For example, the mono audio signal of user humming 113, which may be represented as a time-domain signal, may be transformed, via Fourier transform, to a frequency domain representation. The Fourier frequency domain representation may take a form as a summation of a plurality of frequency components, each frequency component corresponding to a respective tone of the audio signal.

The media guidance application may transmit a query based on the generated frequency domain representation to a music database. For example, the media guidance application may generate an audio signature based on the frequency domain representation of the user humming 113, and send the audio signature to the music database (e.g., data source 716 in FIG. 7) storing audio signatures of different media assets. In response to the query, the media guidance application may receive a result indicating an identified media asset, e.g., the name of a song, a music album, an artist, etc. Or the media guidance application may receive an indication of a failure to find a match in the music database based on the generated frequency domain representation. For example, when the user humming 113 is inaccurate or off-key, the media guidance application may not be able to identify the tune based on audio signature match. For another example, when the user humming 113 corresponds to a melody of "soft kitty" featured in the television show "the Big Bang Theory," and the melody itself is not published or stored as a song in the music database, the media guidance application may not be able to identify it.

In response to receiving no result by database search, the media guidance application may determine media assets that the user have has been recently exposed to. Specifically, the media guidance application may retrieve, from a profile of the user, a location history of the user and an application usage history corresponding to the user within a pre-defined duration of time prior to the first time instance, e.g., the previous 12 hours, 24 hours, and/or the like before the time when the user humming 113 is captured.

In some embodiments, the media guidance application may transmit a request to the user device 114 for the location history and/or the application usage history. Specifically, the media guidance application may transmit a query to a device of the user for a GPS log and an application usage log within the pre-defined duration of time prior to the first time instance. For example, the user device 114 may keep a GPS log that tracks the location of the user device. Similarly, the user device 114 may keep an application usage log that track the application usage on the user device. In some embodiments, the media guidance application may retrieve, from a user profile, information relating to more than one user devices that correspond to the user 102, and may then collect GPS logs and/or application usage history from the various user devices.

In some embodiments, the GPS log may not be available from a user device 114. For example, the user device 114 may not be configured to share the GPS log information with the media guidance application. In this case, the media guidance application may gather other indications of user activities to collect information relating to the location history, e.g., user calendar information, user social media activities (such as "check-in" at a location), user social communications, and/or the like. Specifically, the media guidance application may transmit, to a server, a query for a record of social media activities relating to the user within the pre-defined duration prior to the first time instance, e.g., 12 hours, 24 hours before the user humming 113 was captured. In response to the query for the record of social media activities, the media guidance application may search the record of social media activities relating to the user for a first subset of social media activities, in which each social media activity from the subset identifying a location. For example, the media guidance application may retrieve social media posts relating to the user within the past 12 hours, and identify social media posts showing the user "check-in" at a location, e.g., a "check-in" post at the "science club" 116. The media guidance application may then store the first subset of social media activities and corresponding locations as part of the location history. For another example, the media guidance application may determine a location the user has traveled to, e.g., "TV night at the science club," from a calendar of the user, from a group chat message, from a reservation email, and/or the like.

In some embodiments, when the application usage history is not available or sharable from the user device 114, the media guidance application may gather application usage information through third party social media posts. Specifically, in response to receiving a notification that the application usage history is unavailable from the device of the user, the media guidance application may search the record of social media activities relating to the user for a second subset of social media activities. Each social media activity from the second subset indicates that the user is using a respective application. For example, when the user 102 was playing a video game via a gaming application on the user device 114, the gaming application may generate and post a social media status as "Jane Doe is playing Super Candy" on social media. Another example includes a user sharing a rating of a media asset that he or she just watched on social media, e.g., "Jane Doe just rated the Big Bang Theory on YouTube." The media guidance application may then store the second subset of social media activities and information relating to respective applications as part of the application usage history.

The media guidance application may then identify from the location history, a first location where the user was present during a first period of time within the pre-defined duration of time. For example, the media guidance application may identify, through the past social media status 116 posted by the user, that the user was at the location of "science club" at a certain time.

In some embodiments, the media guidance application may determine whether a given location where the user was present provides any exposure to media assets. Specifically, the media guidance application may identify, from a location history, a plurality of locations that the user has been present at during the pre-defined duration of time. For example, the media guidance application may determine that the user has been present at the "science club," "Delancey street station," "ABC pharmacy," and/or the like, during the past 12 hours. The media guidance application may then determine a first subset of the plurality of locations for locations that the user was present at for more than a threshold amount of time, e.g., 10 minutes, 20 minutes, and/or the like.

In some embodiments, the media guidance application may for each location from the first subset, query a location database for information relating to media availability at the location. For example, the media guidance application may retrieve information from the location database that the location of "science club" has access to a number of broadcast television channels. For another example, the media guidance application may retrieve information from the location database that the location of "Delancey street station" features a display screen for video advertisements and a schedule of the advertisements.

In some embodiments, the media guidance application may determine that the user 102 may be exposed to media assets based on a type of the location, even if the location itself does not provide any media streaming, e.g., a user may usually listen to digital radio via his or her personal device when he or she is located at the gym. Specifically, the media guidance application may determine a type of the respective location. In response to determining that the respective location is of a type that is likely to provide media transmission to the user, e.g., an indoor venue such as a club, a restaurant, a sports bar, etc., the media guidance application may identify the respective location as a candidate for the first location.

In some embodiments, in response to determining that the respective location is of a type that is unlikely to provide media transmission to the user, e.g., an outdoor venue such as a national park, a hiking trail, etc., the media guidance application may determine whether the user may access a media asset via a user device. Specifically, the media guidance application may search the application usage history for an application usage record corresponding to a respective time period when the user was present at the respective location, and determine whether the application usage record relates to media content delivery. For example, the media guidance application may determine that the location history shows the user was present at "Central Park" between 2 PM and 4 PM, and during this time, the application usage history shows that a Pandora application running on the user device 114 was active during 3 PM to 4 PM. The media guidance application may determine that the user was exposed to media assets streamed from the Pandora application when the user was present at "Central Park." Specifically, in response to determining that the application usage record relates to media content delivery, the media guidance application may associate a media asset that is indicated by the application usage record with the respective location.

Figure 2:
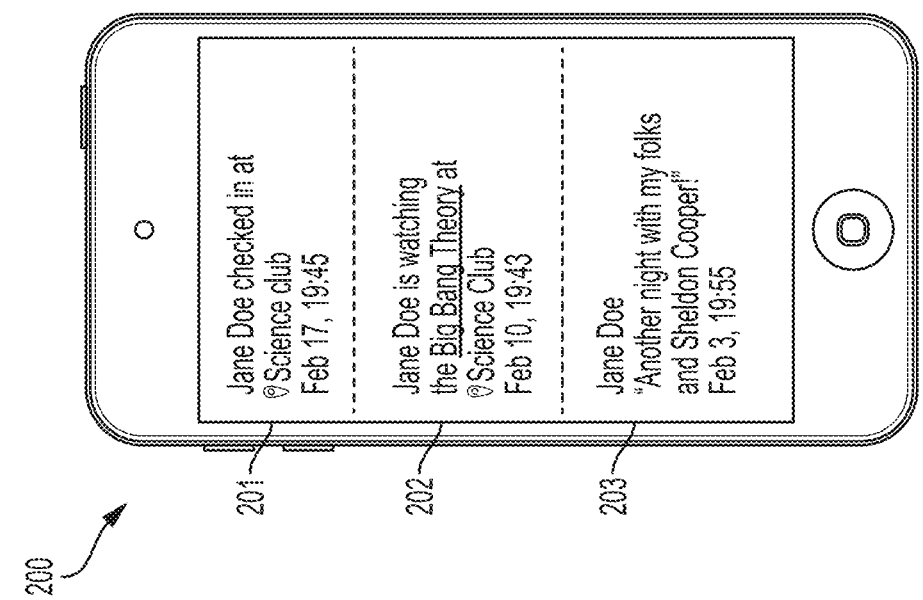
FIG. 2 provides an example diagram illustrating an example of user social media activity record indicating a pattern of watching habits associated with a location that the user is present at, according to embodiments described herein.

In some embodiments, the media guidance application may determine what media source is available at a location where the user was present based on past activity pattern of the user. For example, as shown in FIG. 2, the example social media posts of the user illustrate a pattern that the user usually visits the location of "science club" and watch the television show "the Big Bang Theory" when the show is aired, e.g., see social media posts 202-203 in the past two weeks. Then the media guidance application may determine that for the social media check-in message 201, even if the post does not specify the activity of the user, the user is located at "science club" and may be exposed to "the Big Bang Theory." Specifically, the media guidance application may transmit, to a server, a query for a record of social media activities relating to the user within a past period of time. In response to obtaining the record of social media activities relating to the user, the media guidance application may search the record of social media activities for a subset of social media activities that occurred at the first location. For example, the media guidance application may select social media posts 202-203 that both occurred at the location of "science club." For each social media activity from the subset, the media guidance application may extract one or more keywords from the respective social media activity. For example, the media guidance application may extract "watching," "Big Bang Theory" from post 202; and extract "night," "folks," "Sheldon Cooper," from post 203. The media guidance application may then search a past transmission schedule across a plurality of media sources at a respective time corresponding to the respective social media activity based on the one or more keywords. For example, the media guidance application may search a program listing, e.g., retrieved from data source 716 or 718 in FIG. 7, based on keywords "Big Bang Theory" or "Sheldon Cooper." In response to the search or query, the media guidance application may identify the media asset "the Big Bang Theory" and the corresponding air time, and the media guidance application may verify that the air time coincides with the time that the user was present at the location "science club," as reflected in the posting time of the social media post 201. Thus, in response to identifying a media asset from a media source from the past transmission schedule matches the one or more keywords, the media guidance application may determine that the media source, e.g., the television channel on which "Big Bang Theory" is aired, is available at the first location.

Upon determining the source of the media asset available at the first location during the first period of time, the media guidance application may determine whether the user was paying attention to the media asset displayed at the location when the user was present at the location. For example, even if the user was present at "science club" for "television night" to watch the "Big Bang Theory," the user might be distracted, e.g., playing video games on his or her user device 114, working on a word document on a personal computer, talking on a phone, etc. Different types of user activities may affect the chance that the user was exposed to the media asset. For example, if the user was actively working on a word document at the "science club," where the media asset was being played, the user is likely to be at least partially exposed to the media asset. For another example, if the user was streaming a live football game on his or her user device when the user was present at the "science club" where "the Big Bang Theory" was played, the user is much less likely to be exposed to the "Big Bang Theory."

In some embodiments, the media guidance application may utilize the application usage history to determine whether the user was distracted. Specifically, the media guidance application may retrieve content of a first media asset transmitted from the source of media asset during the first period of time, and determine whether the user was exposed to the retrieved content of the media asset based at least in part on user application usage history from a user device. The media guidance application may search the application usage history for one or more application usage records corresponding to the first period of time when the user was present at the first location. For example, the media guidance application may retrieve a list of applications that have been accessed or used during the time frame when the media asset "the Big Bang Theory" was being aired, and when the user was present at the "science club." The list of applications may include the name of each application that has been accessed and a duration of time when the application has been accessed.

In some embodiments, in response to identifying the one or more application usage records, the media guidance application may determine an application type, an application usage status and an application usage time duration for each of the one or more application usage records. For example, the application usage record may indicate a gaming application was active from 19:48 to 20:26, and an email application was accessed from 20:15 to 20:19, and/or the like. The media guidance application may then search, an application usage table, for a distraction score corresponding to each application type. For example, the distraction score is a numeric value indicative of a degree that the user is distracted from other activities, i.e., the higher the distraction score, the more occupied the user is with the respective application and less likely to pay attention to media assets playing in the background. An example distraction table may take a form similar to the following:

TABLE 1

| Example Distraction Scores | |
|---|---|
| Application Type | Distraction Score |
| Gaming Application | 0.85 |
| Media player | 0.90 |
| Social media | 0.66 |
| Email | 0.55 |

In some embodiments, the media guidance application may compute a distraction metric based on the distraction score corresponding to each application type, the respective application usage status and the respective application usage time duration. For example, the distraction metric is computed as a weighted sum of the respective distraction scores of all applications that have been accessed during the time when the user was present at the location "science club." Each distraction score is weighted by a percentage of time duration that the application is in use as compared to the entire duration when the user was present at the location. For example, if the application usage record shows a gaming application was accessed from 19:48 to 20:26, and an email application was accessed from 20:15 to 20:19, and the location history shows the user was present at "science club" from 19:30 to 20:30, the distraction metric is calculated as: $0.85 \times 38/60 + 0.55 \times 4/60 = 0.57$.

In some embodiments, in response to determining that the distraction metric is higher than a distraction threshold (e.g., 0.5, etc.), the media guidance application may determine that the user was not exposed to the retrieved content of the media asset. In response to determining that the user was exposed to the retrieved content of the first media asset, the media guidance application may proceed to determine whether the media asset the user has been exposed to contains the user humming 113. Specifically, the media guidance application may determine a first plurality of music tunes transmitted with the content of the first media asset.

For example, in some embodiments, the media guidance application may retrieve metadata associated with the first media asset to determine whether the metadata includes information relating to a theme song, or information relating to the background music. If the metadata identifies a title of a song that is featured in the media asset, the media guidance application may transmit a query to a music database based on the title of the theme song. In response to the query, the media guidance application may obtain an audio asset of the theme song and generating a tune for the audio asset. For example, the media guidance application may generate an audio signature of the theme song. In response to determining that the metadata includes no information relating to any theme song, the media guidance application may perform audio analysis of the first media asset to generate the plurality of music tunes. For example, the media guidance application may analyze the frequency spectrum of the audio track of the media asset, and generate one or more audio signatures of audio signals representing instrumental sounds.

In some embodiments, the media guidance application may use application usage history to determine what content the user has been exposed to, e.g., music from video games, streaming media, etc. Specifically, in response to retrieving, from the profile of the user, the application usage history corresponding to the user within the pre-defined duration of time prior to the first time instance, for each application from the application usage history, the media guidance application may determine whether the respective application delivers media content to the user by search an application inventory based on a respective application identifier. For example, the media guidance application may query an application inventory based on the application identifier to determine whether the application delivers content. In response to determining that the respective application delivers media content to the user, the media guidance application may further determine a type of media content that the respective application delivers. For example, in response to determining that the respective application provides live transmission of media content (e.g., an Internet TV application, etc.), the media guidance application may identify a media asset that was transmitted via the respective application during the pre-defined duration of time as a candidate for the first media asset. For another example, in response to determining that the respective application provides an on-demand media asset (e.g., a media streaming application, etc.), the media guidance application may identify the on-demand media asset that was transmitted to the user. For another example, in response to determining that the respective application provides a gaming application, the media guidance application may query, a gaming database, for an audio signature of tunes used in the gaming application based on a name of the gaming application.

The media guidance application may compare the frequency domain representation of the plurality of tones with each music tune of the first plurality of music tunes to generate a respective similarity metric. For example, the media guidance application may generate an audio signature for the tune representing the user humming 113, and an audio signature for each of the music tune, and in turn compare the audio signatures. In response to determining that the respective similarity metric is greater than a similarity threshold (e.g., 76%, 82%, etc.), the media guidance application may identify the respective music tune from the first media asset corresponds to the audio recording from the user.

The media guidance application may then generate for display a recommendation of the first media asset featuring the respective music tune. For example, the media guidance application may identify that the user humming 113 corresponds to a melody of "soft kitty" sung by a character in a recently aired episode of "the Big Bang Theory" that the user has been exposed to. The media guidance application may then recommend media assets 108a-b, relating to the television episode, or the melody featured in the episode to the user.

Figure 3:
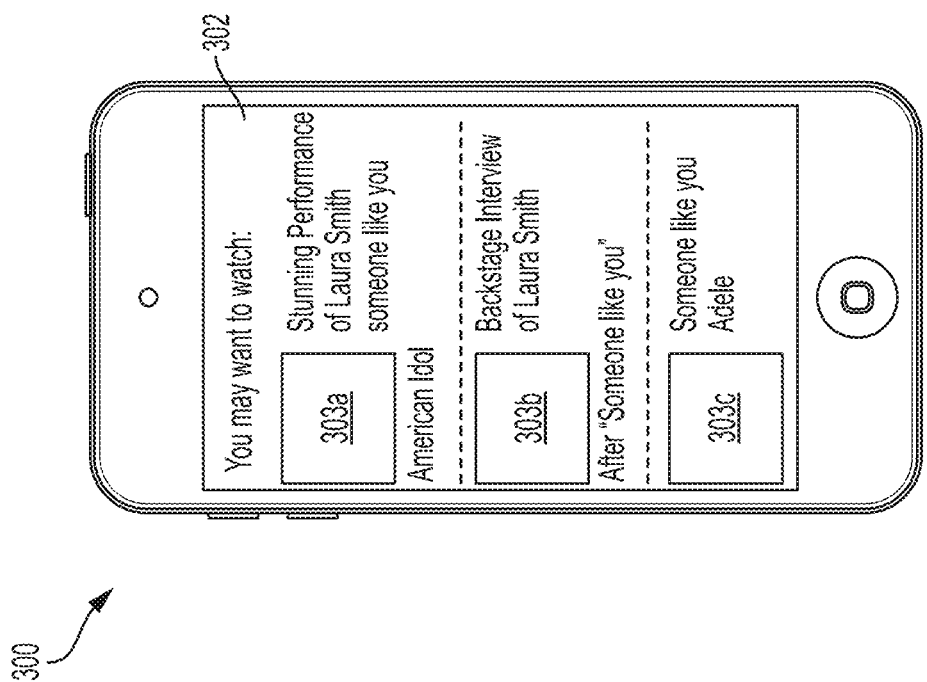
FIG. 3 shows an example diagram illustrating an example screen of recommended media assets based on the identified media asset from FIG. 1, accordingly to embodiments described herein.

For another example, as shown in FIG. 3, if the media guidance application identifies a tune that the user is humming corresponds to the song "Someone like you," the media guidance application may further determine, in a similar manner as described above, that the user has been recently exposed to a performance in the "American Idol" show featuring "Someone like you." The media guidance application may prioritize media assets 302a-b relating to the "American Idol" episode that features the performance of "Someone like you" as recommended content to the user. The media guidance application may also optionally recommend the original version of "Someone like you" 303c to the user.

In some embodiments, the media guidance application may include social influence from another user in searching for a media asset to match with the user humming 113. For example, if the user 102 has been interacting with another user, who may have been humming the same melody during their interaction, and influenced the user 102. In this case, the user may have been influenced by the other, even if the application usage history or location history of the user does not show any exposure to a corresponding media asset.

Specifically, in response to determining that the respective similarity metric is lower than a similarity threshold, the media guidance application may determine whether a social connection of the user has been co-located at a same location with the user during the pre-defined duration of time based on the location history of the user and a social media activity at the same location. For example, if the user and the social contact has checked in at the same time at the same location, e.g., a restaurant, the media guidance application may determine that the user and the social contact has social interaction at the location. In response to determining that the social connection of the user has been co-located at the same location with the user, the media guidance application may expand the search to media assets that the user's social connection has been exposed to, which may have likely in turn influenced the user. Specifically, the media guidance application may obtain, from a server, a location history of the social connection and an application usage history of the social connection prior to a time when the social connection and the user were co-located at the same location. For example, the media guidance application may determine a second media asset that the social connection was exposed to, based on the location history of the social connection and the application usage history of the social connection. The media guidance application may determine a second plurality of music tunes transmitted with the content of the second media asset, and compare the frequency domain representation of the plurality of tones with each music tune of the second plurality of music tunes to determine whether the tune corresponds to the second media asset.

Figure 4:
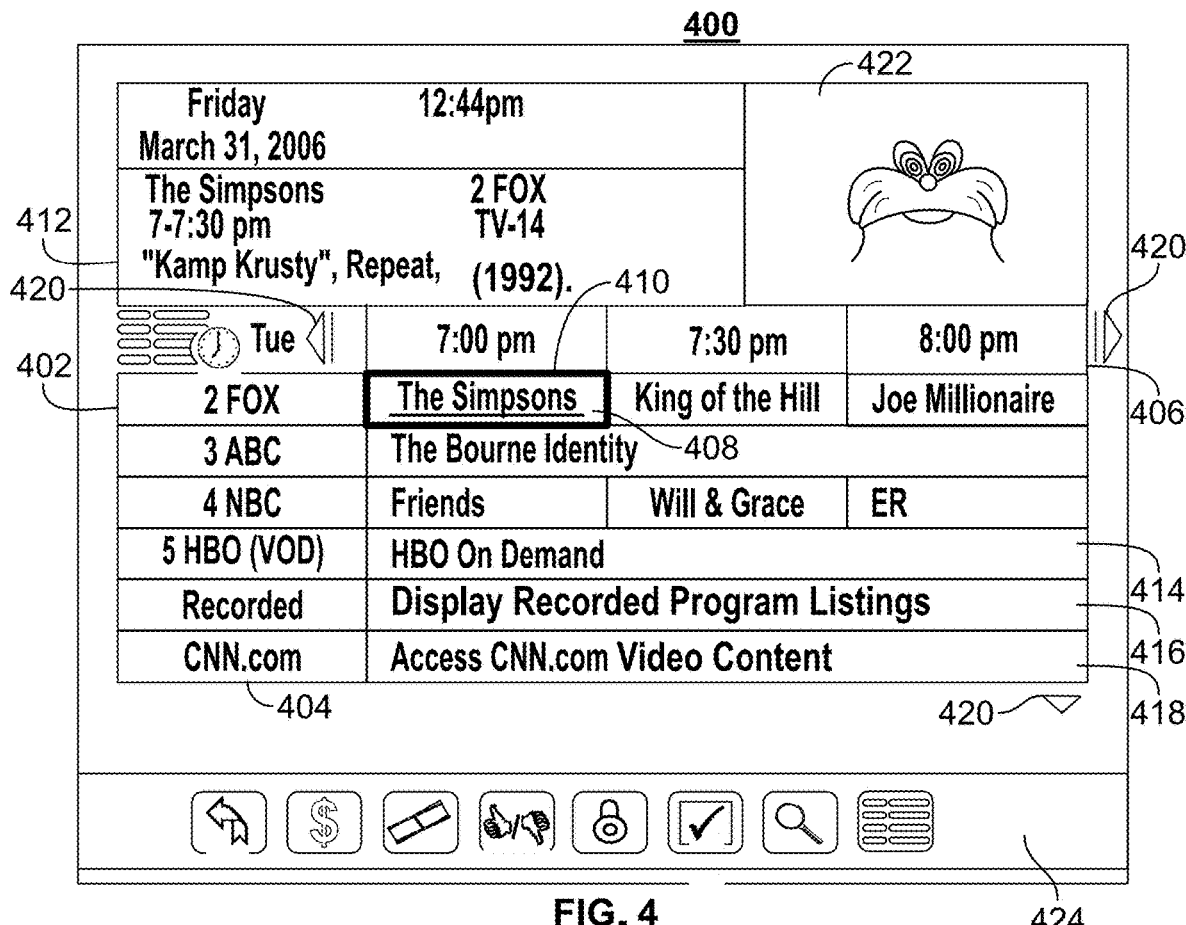
FIG. 4 shows an illustrative embodiment of a display screen that may be used to provide media guidance application listings and other media guidance information, in accordance with some embodiments of the disclosure.
Figure 5:
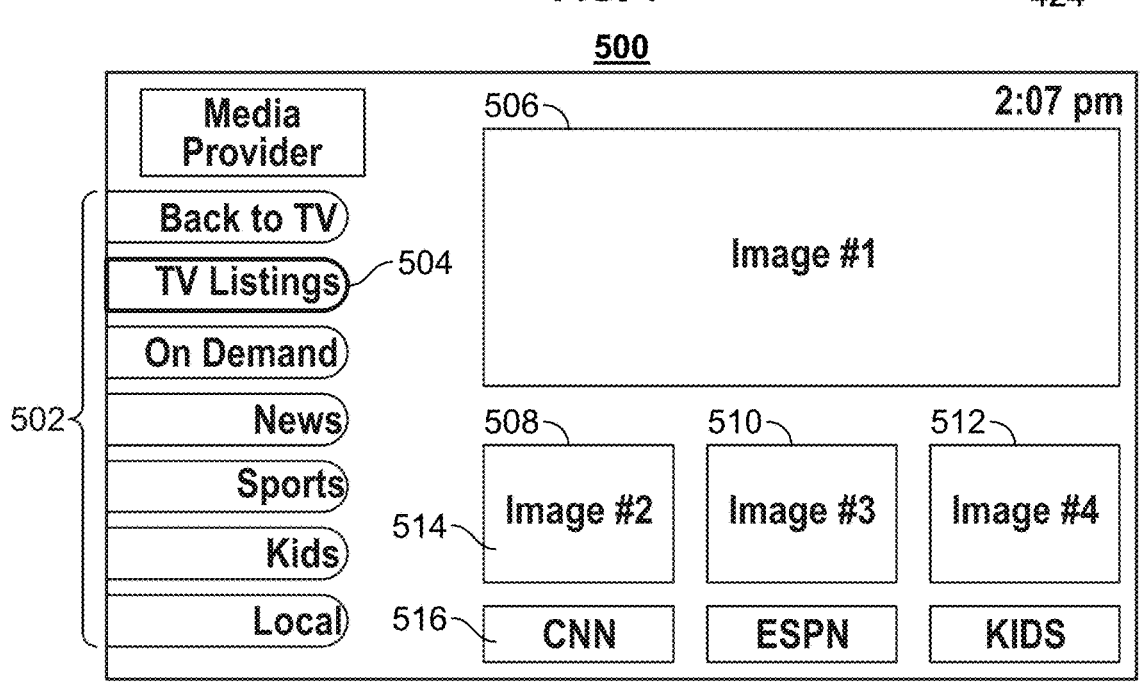
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform, e.g., user equipment 106 or the set-top box 120 in FIG. 1. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each program listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 4003 and Yuen et al. U.S. Pat. No. 6,239,794, issued May 49, 4001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 4D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
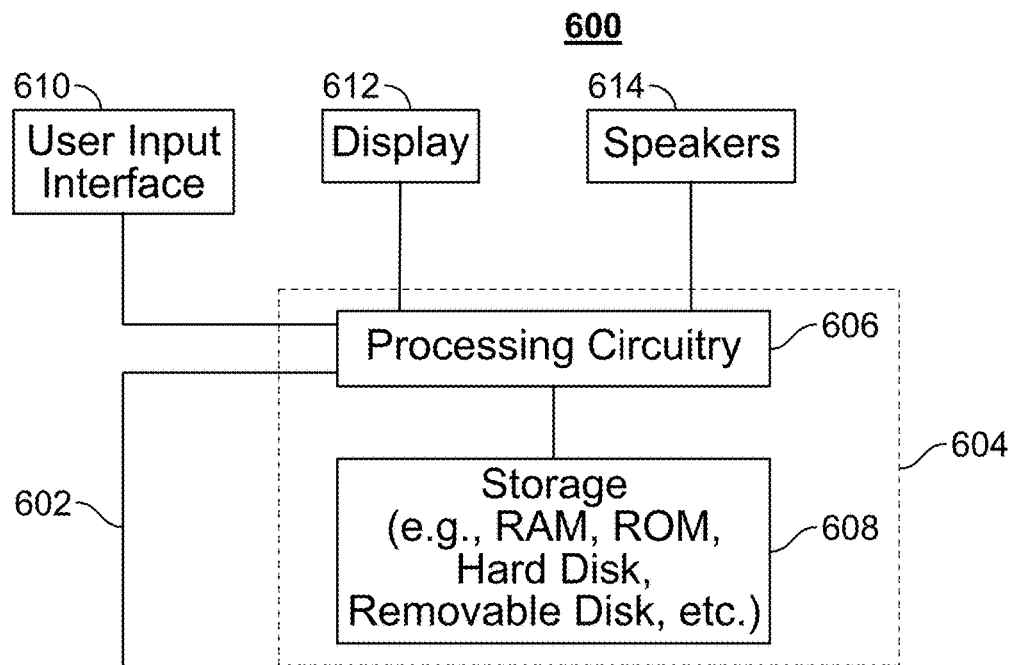
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 600 of FIG. 6 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

Figure 7:
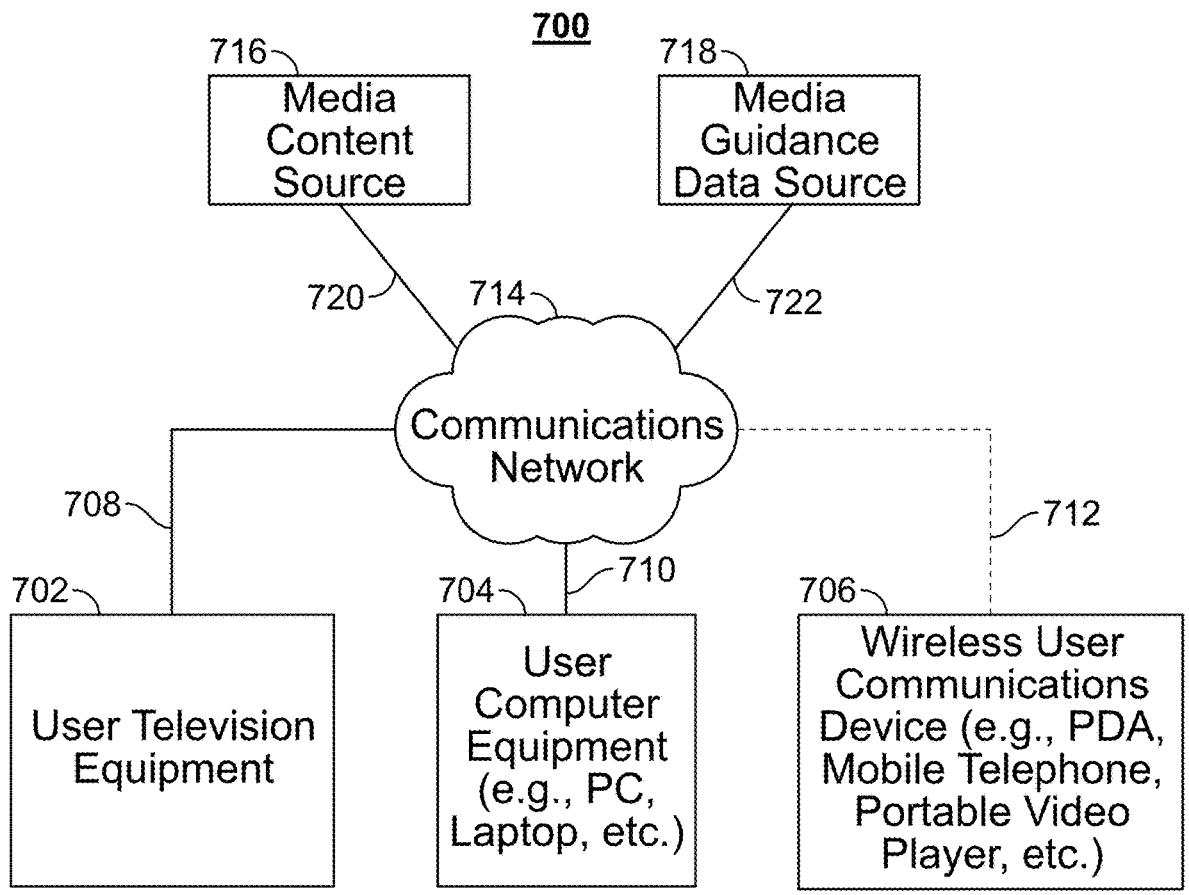
FIG. 7 is a block diagram of an illustrative media system in accordance with some embodiments of the disclosure.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users'' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 604 of a user equipment device 400. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

Figure 8:
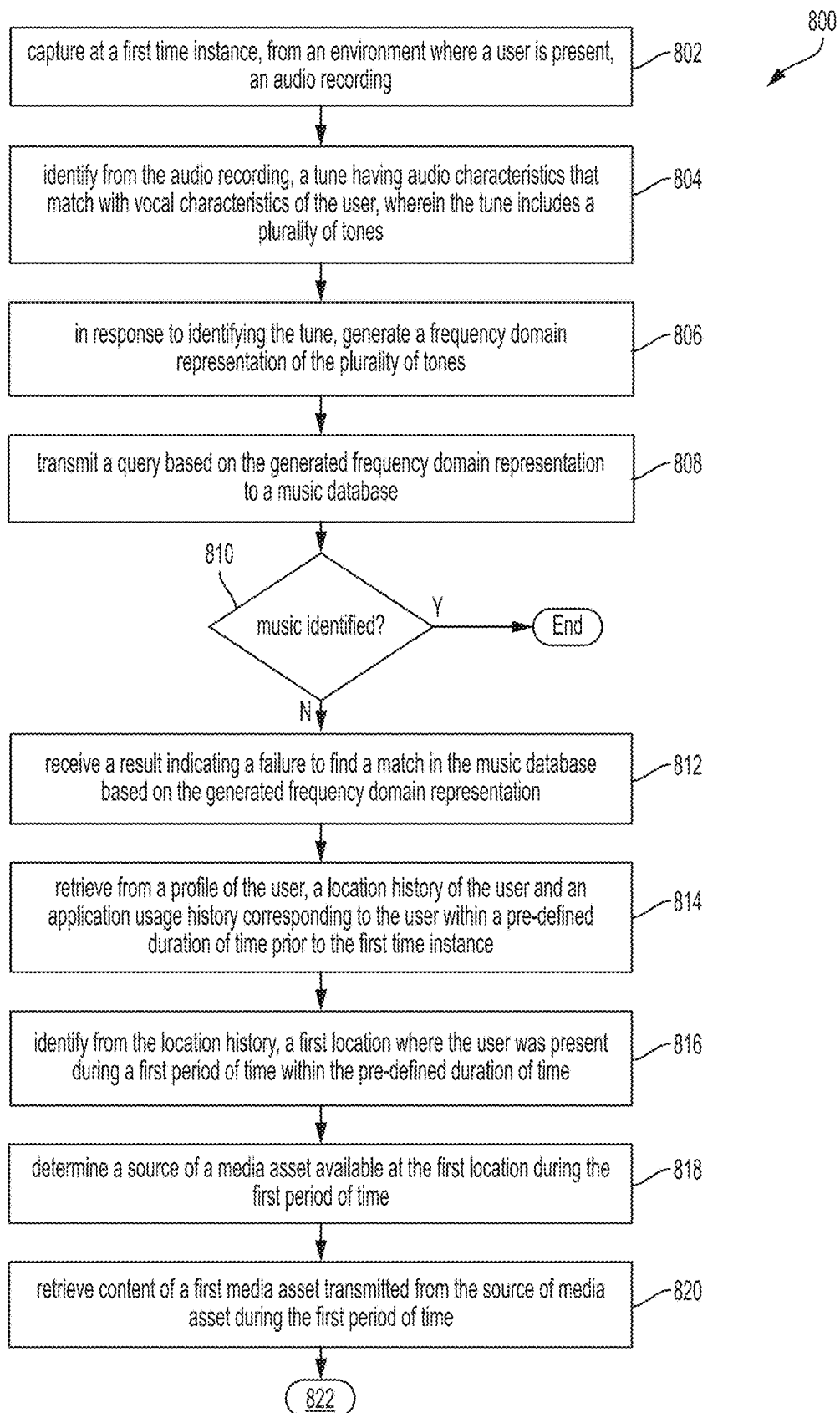
FIG. 8 depicts an illustrative flowchart of a process for identifying a media asset based on an ambiguous search indicator provided by a user, in accordance with some embodiments of the disclosure.
Figure 8:
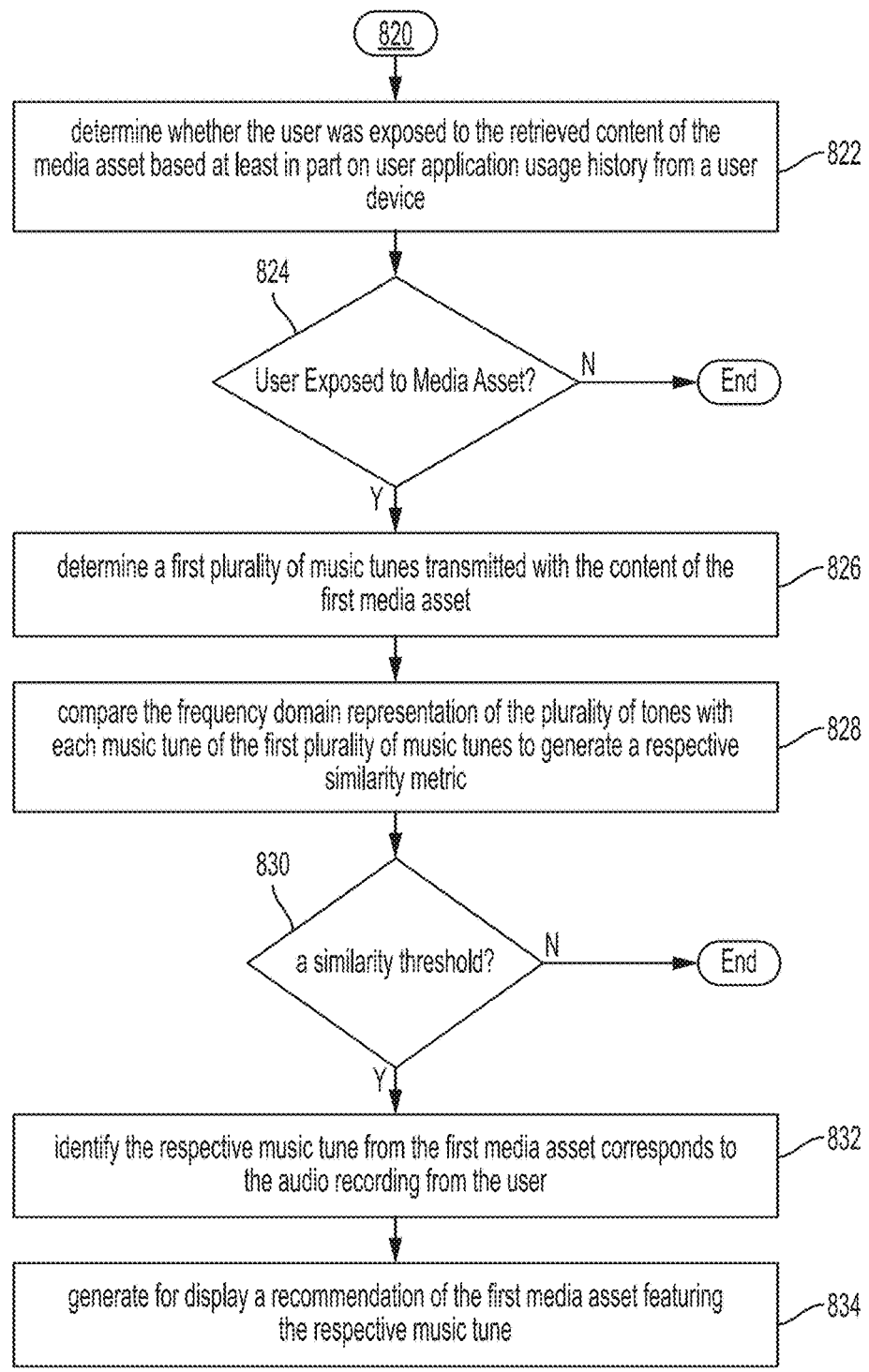

FIG. 8 depicts an illustrative flowchart of a process for identifying a media asset based on an ambiguous search indicator provided by a user, in accordance with some embodiments of the disclosure. Process 800 may be executed by control circuitry 604 (e.g., in a manner instructed to control circuitry 604 by the media guidance application). Control circuitry 604 may be part of user equipment (e.g., user equipment 106, which may have the functionality of any or all of user television equipment 702, user computer equipment 704, and/or wireless communications device 706), or of a remote server separated from the user equipment by way of communications network 714.

Process 800 begins at 802, where control circuitry 604 captures, at a first time instance, from an environment where a user is present, an audio recording. For example, control circuitry 604 engages an audio recorder, via I/O path 604 in FIG. 6, to periodically, intermittently or periodically record ambient audio content from the environment. At 804, control circuitry 604 identifies, from the audio recording, a tune having audio characteristics that match with vocal characteristics of the user, wherein the tune includes a plurality of tones. At 806, control circuitry 604, in response to identifying the tune, generates a frequency domain representation of the plurality of tones. For example, control circuitry 604 transforms the audio recording to the frequency domain to extract audio signals that have the user vocal characteristics. At 808, control circuitry 604 transmits a query based on the generated frequency domain representation to a music database, e.g., at storage 608 in FIG. 6, or data source 716 in FIG. 7. At 810, when the music is identified in response to the query, process 800 may end. When the music is unidentified in response to the query, process 800 proceeds to 812, where control circuitry 604 receives a result indicating a failure to find a match in the music database based on the generated frequency domain representation.

At 812, control circuitry 604 retrieves, from a profile of the user, a location history of the user and an application usage history corresponding to the user within a pre-defined duration of time prior to the first time instance. For example, control circuitry 604 sends a request to a user device, via the I/O path 604 I FIG. 6 to retrieve the location history of the user device. At 816, control circuitry 604 identifies, from the location history, a first location where the user was present during a first period of time within the pre-defined duration of time. Further description of identifying the first location is provided in FIG. 9. At 818, control circuitry 604 determines a source of a media asset available at the first location during the first period of time, which is further described in FIG. 10. At 820, control circuitry 604 retrieves content of a first media asset transmitted from the source of media asset during the first period of time. At 822, control circuitry 604 determines whether the user was exposed to the retrieved content of the media asset based at least in part on user application usage history from a user device, as further described in FIG. 11.

At 824, in response to determining that the user was not exposed to the retrieved content of the media asset, process 800 may end, or proceed to process another media asset or another location the user was present at. At 804, in response to determining that the user was exposed to the retrieved content of the media asset, process 800 proceeds to 826, where control circuitry 604 determines a first plurality of music tunes transmitted with the content of the first media asset. At 828, control circuitry 604 compares the frequency domain representation of the plurality of tones with each music tune of the first plurality of music tunes to generate a respective similarity metric. At 830, when the similarity metric is greater than a similarity threshold, control circuitry 604 identifies the respective music tune from the first media asset corresponds to the audio recording from the user, e.g., at 832. At 834, control circuitry 604 generates for display a recommendation of the first media asset featuring the respective music tune. For example, control circuitry 604 generates for display, via the display circuitry 612 in FIG. 6, recommended media assets 108a-b shown in FIG. 1, or 303a-c shown in FIG. 3.

Figure 9:
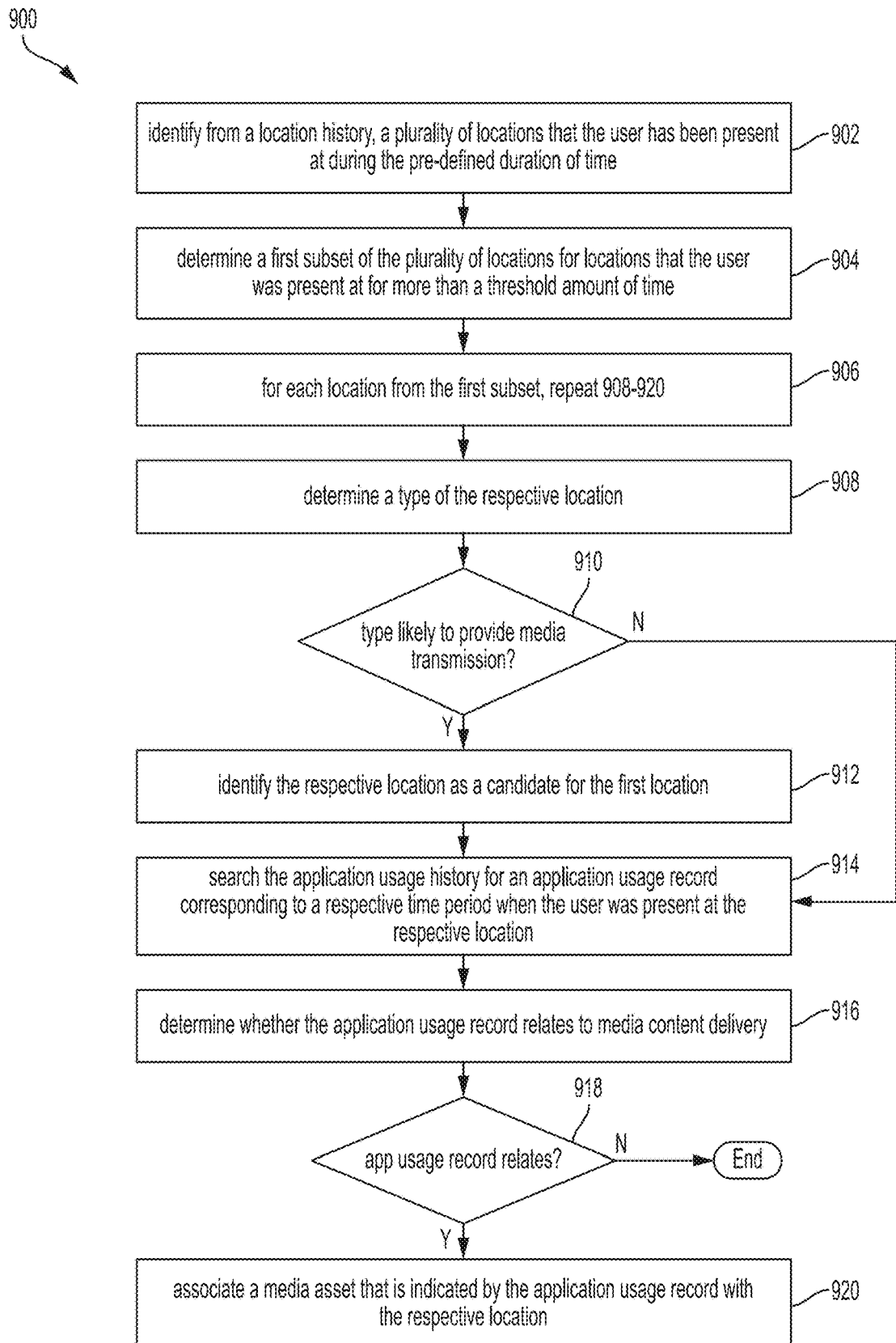
FIG. 9 depicts an illustrative flowchart of a process for identifying from a location history a location where the user is likely to be exposed to a media asset, in accordance with some embodiments of the disclosure.

FIG. 9 depicts an illustrative flowchart of a process for identifying from a location history a location where the user is likely to be exposed to a media asset (e.g., see 816 in FIG. 8), in accordance with some embodiments of the disclosure. Process 900 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 900 begins at 902, where control circuitry 604 identifies, from a location history, a plurality of locations that the user has been present at during the pre-defined duration of time. At 904, control circuitry 604 determines a first subset of the plurality of locations for locations that the user was present at for more than a threshold amount of time. For example, control circuitry 604 filters the plurality of locations where the user was present by the threshold amount of time, e.g., 10 minutes, etc. At 906, for each location from the first subset, control circuitry 604 performs 908-920 as below. At 908, control circuitry 604 determines a type of the respective location. For example, control circuitry 604 queries a location database, e.g., at storage 608 in FIG. 6, based on an identifier of the location (e.g., GPS coordinates, street address, a business name, etc.).

At 910, if the type of the location is likely to provide exposure of media assets, e.g., an indoor venue such as a restaurant, a train station, a club, etc., process 900 proceeds to 912, where control circuitry 604 identifies the respective location as a candidate for the first location. At 910, if the type of the location is unlikely to provide exposure of media assets, e.g., an outdoor venue such as a national park, a hiking trail, etc., process 900 proceeds to 914, where control circuitry 604 searches the application usage history for an application usage record corresponding to a respective time period when the user was present at the respective location. At 916, control circuitry 604 determines whether the application usage record relates to media content delivery. For example, control circuitry 604 queries an application database, e.g., t storage 608 in FIG. 6 to determine whether each application can be used for media content delivery, e.g., a streaming application, a digital radio application, a gaming application, etc. At 918, when the application usage record indicates the application used is related to content delivery, process 900 proceeds to 920, where control circuitry 604 associates a media asset that is indicated by the application usage record with the respective location. Otherwise, when the application usage record indicates the application used is unrelated to content delivery, process 900 ends.

Figure 10:
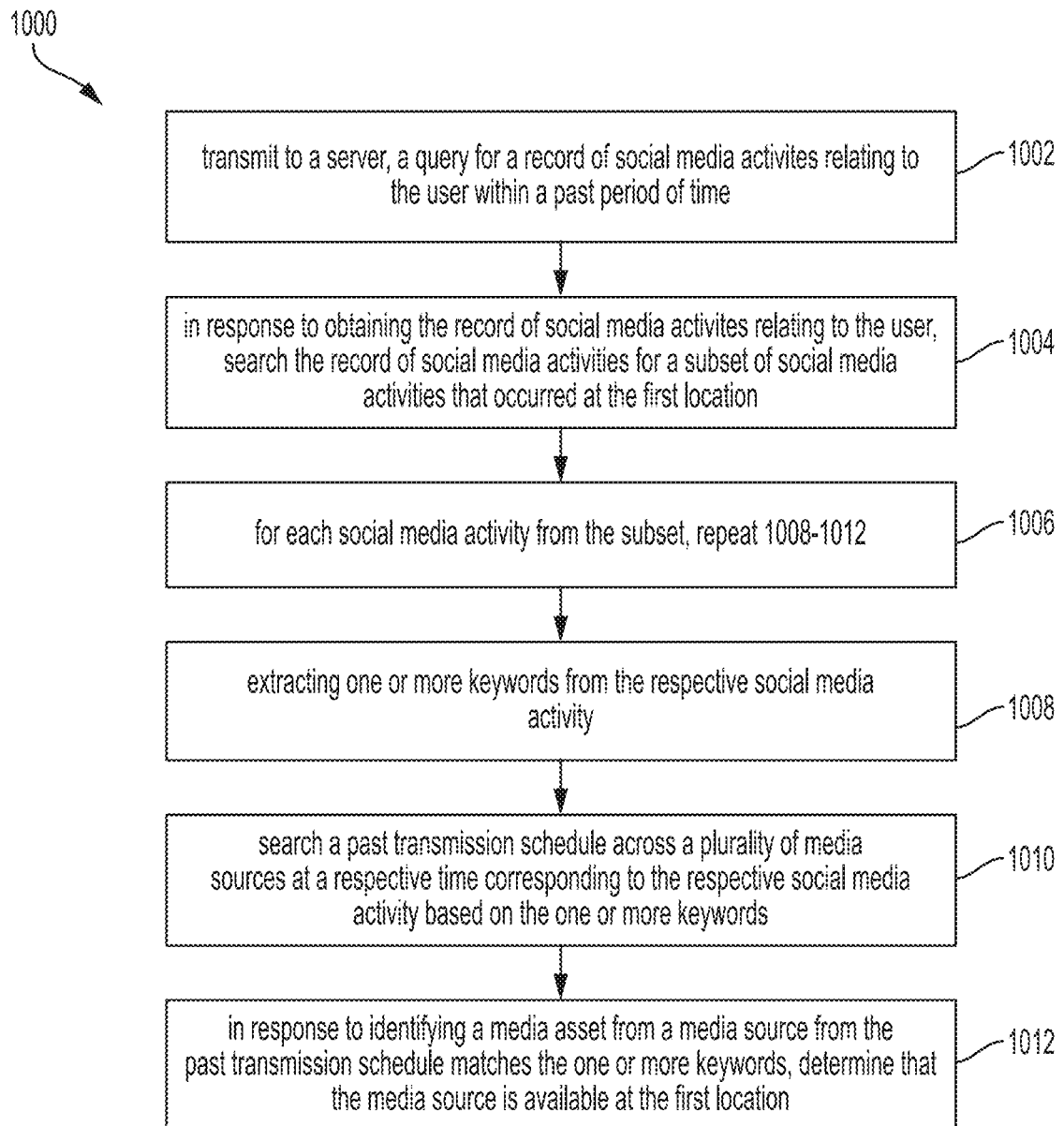
FIG. 10 depicts an illustrative flowchart of a process for determining a media source available at a location during the time when the user was present at the location, in accordance with some embodiments of the disclosure.

FIG. 10 depicts an illustrative flowchart of a process for determining a media source available at a location during the time when the user was present at the location (e.g., see 818 in FIG. 8), in accordance with some embodiments of the disclosure. Process 1000 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1000 begins at 1002, where control circuitry 604 transmits, to a server, e.g., data source 718 via communications network 714 in FIG. 7, a query for a record of social media activities relating to the user within a past period of time. At 1004, control circuitry 604, in response to obtaining the record of social media activities relating to the user, searches the record of social media activities for a subset of social media activities that occurred at the first location, e.g., with a search query term of "science club." At 1006, for each social media activity from the subset, control circuitry 604 performs 1008-1012 as below. At 1008, control circuitry extracts one or more keywords from the respective social media activity, e.g., "watching," "Big Bang Theory," etc. (see 202-203 in FIG. 2). At 1010, control circuitry 604 searches a past transmission schedule across a plurality of media sources at a respective time corresponding to the respective social media activity based on the one or more keywords. For example, control circuitry 604 obtains the past transmission schedule data from data source 718 via communications network 714 in FIG. 7. At 1012, in response to identifying a media asset from a media source from the past transmission schedule matches the one or more keywords, control circuitry 604 determines that the media source is available at the first location, e.g., the television channel that broadcasts the show "Big Bang Theory" is available at the location "science club," as described in FIG. 2.

Figure 11:
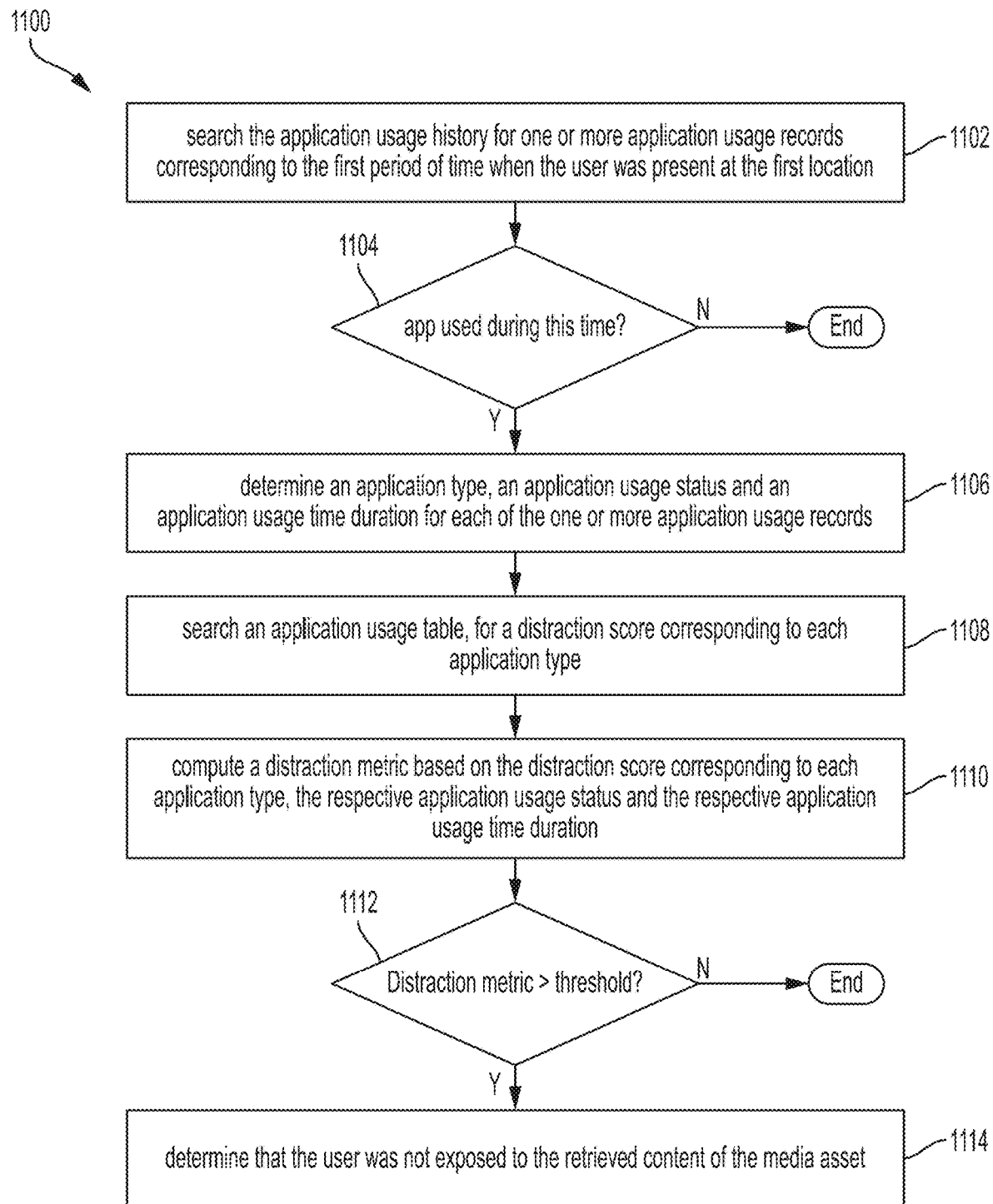
FIG. 11 depicts an illustrative flowchart of a process for determining whether the user was exposed to a media asset when the media asset was displayed at a location where the user was present, in accordance with some embodiments of the disclosure.

FIG. 11 depicts an illustrative flowchart of a process for determining whether the user was exposed to a media asset when the media asset was displayed at a location where the user was present (e.g., see 822 in FIG. 8), in accordance with some embodiments of the disclosure. Process 1100 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1100 begins at 1102, where control circuitry 604 searches the application usage history for one or more application usage records corresponding to the first period of time when the user was present at the first location. At 1104, when at least one application was actively used during the time when the user was present at the location, e.g., "science club," process 1100 proceeds to 1106, where control circuitry 604 determines an application type, an application usage status and an application usage time duration for each of the one or more application usage records. At 1108, control circuitry 604 searches, an application usage table, for a distraction score corresponding to each application type, e.g., as shown in Table 1. At 1110, control circuitry 604 computes a distraction metric based on the distraction score corresponding to each application type, the respective application usage status and the respective application usage time duration. At 1112, when the computed distraction metric is greater than a distraction threshold, control circuitry 604 determines that the user was not exposed to the retrieved content of the media asset at 1114. Otherwise, when the computer distraction is no greater than the distraction threshold, process 900 proceeds to 826 in FIG. 8.

Figure 12:
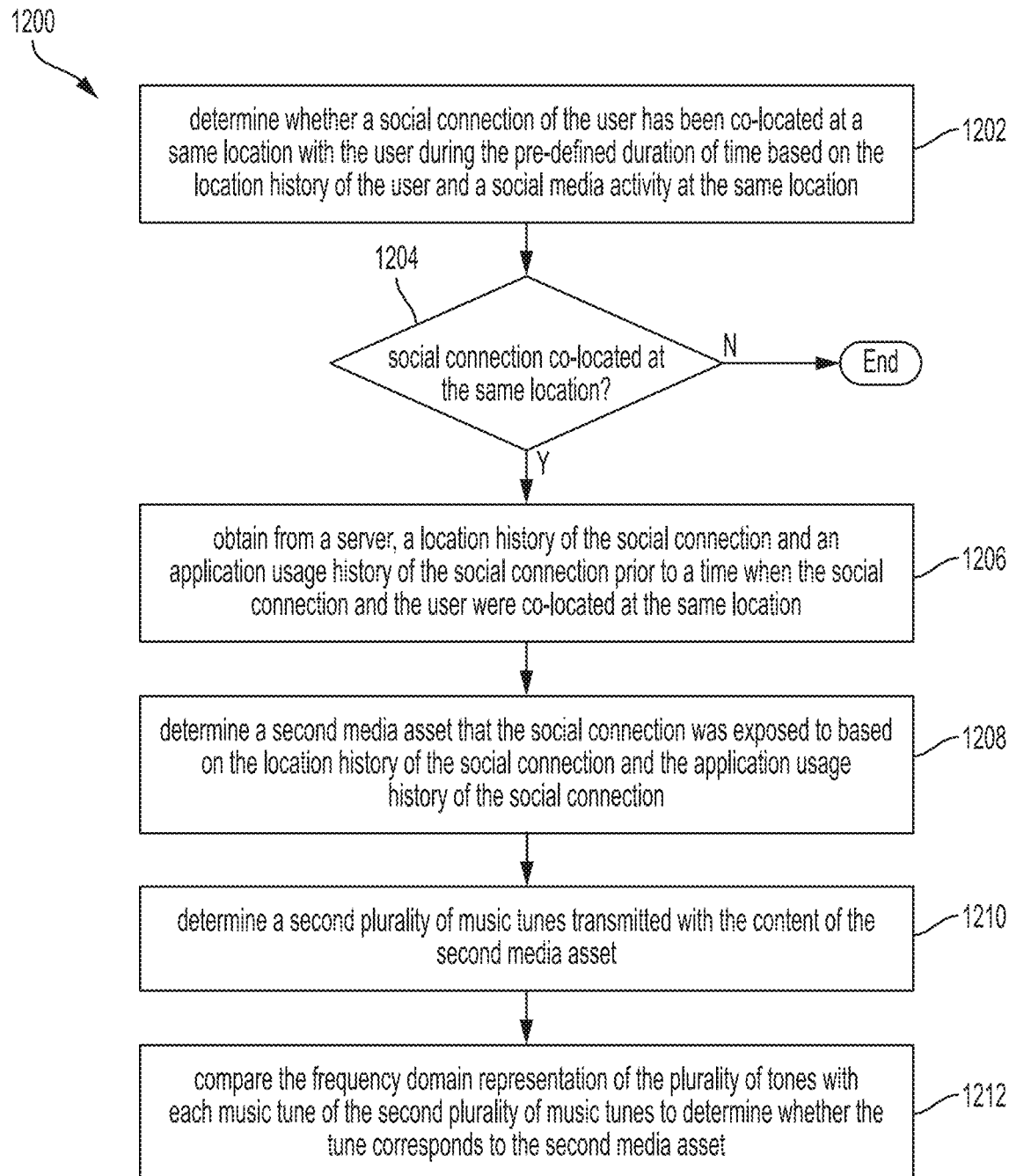
FIG. 12 depicts an illustrative flowchart of a process for identifying a media asset in response to a user humming based on social influence from another user, in accordance with some embodiments of the disclosure.

FIG. 12 depicts an illustrative flowchart of a process for identifying a media asset in response to a user humming based on social influence from another user, in accordance with some embodiments of the disclosure. Process 1200 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1200 begins at 1202, where control circuitry 604 determines whether a social connection of the user has been co-located at the same location with the user during the pre-defined duration of time based on the location history of the user and a social media activity at the same location. For example, in response to determining that no media asset is found corresponding to the tune from the user at 830 in FIG. 8, control circuitry 604 queries the social media activity history of the user, e.g., from storage 608 in FIG. 6 or data source 718 in FIG. 7, based on a first user identifier for the user and a second user identifier for the social connection of the user. At 1204, if control circuitry 604 identifies that a social connection is co-located at the same location with the user, process 1200 proceeds to 1206, where control circuitry 604 obtains, from a server, e.g., data source 718 in FIG. 7, a location history of the social connection and an application usage history of the social connection prior to a time when the social connection and the user were co-located at the same location. At 1208, control circuitry 604 determines a second media asset that the social connection was exposed to, based on the location history of the social connection and the application usage history of the social connection. At 1210, control circuitry 604 determines a second plurality of music tunes transmitted with the content of the second media asset. At 1212, control circuitry 604 compares the frequency domain representation of the plurality of tones with each music tune of the second plurality of music tunes to determine whether the tune corresponds to the second media asset. In this way, control circuitry 604.

It should be noted that processes 800-1200 or any step thereof could be performed on, or provided by, any of the devices shown in, or described with respect to, FIGS. 1-3 and 6-7. For example, any of processes 800-1200 may be executed by control circuitry 604 (FIG. 6) as instructed by control circuitry implemented on user equipment 106 (FIG. 1), 702, 704, 706 (FIG. 6), and/or the like for generating and displaying a summary view of a media asset. In addition, one or more steps of processes 800-1200 may be incorporated into or combined with one or more steps of any other process or embodiment.

It is contemplated that the actions or descriptions of each of FIGS. 8-12 may be used with any other embodiment of this disclosure. In addition, the actions and descriptions described in relation to FIGS. 8-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-12 could be used to perform one or more of the actions in FIGS. 8-12.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a source of media assets available at a location that the user was present at (see 818 in FIG. 8), e.g., by processing circuitry 606 of FIG. 6. The processing circuitry, for instance, may be a general purpose processor, a customized integrated circuit (e.g., an ASIC), or a field-programmable gate array (FPGA) within user equipment 600, media content source 716, or media guidance data source 718. For example, the attributes of media assets, may be stored in, and retrieved from, storage 608 of FIG. 6, or media guidance data source 718 of FIG. 7. Furthermore, processing circuitry, or a computer program, may update configuration data of the media guidance application, which may be stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for identifying a media asset, the method comprising:
   capturing, from an environment where a user is present, an audio recording;
   retrieving information about a user's location;
   identifying a source of media available at the user's location;
   determining content accessible from the source of media;
   comparing the audio recording to the content to identify the media asset having a characteristic associated with the audio recording by:
      determining a plurality of music tunes transmitted with the content;
      comparing the frequency domain representation of the plurality of tones with each music tune of the plurality of music tunes to generate a respective similarity metric; and
      in response to determining that the respective similarity metric is greater than a similarity threshold, identifying a respective music tune from the media asset corresponds to the audio recording provided by the user;
   upon determining a match between the audio recording and the content, generating for display a recommendation of the media asset;
   identifying, from the audio recording, a tune having audio characteristics that match with vocal characteristics of the user, wherein the tune includes a plurality of tones;
   in response to identifying the tune, generating a frequency domain representation of the plurality of tones; and
   transmitting a query based on the generated frequency domain representation to a music database.

2. The method of claim 1, further comprising:
   receiving a result indicating a failure to find a match in the music database based on the generated frequency domain representation.

3. The method of claim 1, wherein identifying, from the audio recording, the tune having audio characteristics that match with vocal characteristics of the user, comprises:
   extracting a set of mono signals from the audio recording;
   for each mono signal from the set of mono signals:
      generating a set of audio characteristics corresponding to the mono signal, wherein the set of audio characteristics includes any of mel-frequency cepstral coefficients (MFCC) and perceptual linear prediction relative spectra (PLP-RASTA);
      retrieving, from a profile of the user, a set of vocal characteristics;
      comparing each characteristic of the set of audio characteristics with a corresponding characteristic from the set of vocal characteristics that has a same type;
      determining whether the set of audio characteristics and the set of vocal characteristics overlap for more than a similarity threshold; and
      in response to determining that the set of audio characteristics and the set of vocal characteristics overlap for more than the similarity threshold, identifying the mono signal as a vocal signal from the user.

4. The method of claim 1, wherein the determining the plurality of music tunes transmitted with the content of the first media asset comprises:
   retrieving metadata associated with the content;
   in response to determining that the metadata includes information relating to a theme song:
      transmitting a query to the music database based on a title of the theme song; and
      in response to the query, obtaining an audio asset of the theme song and generating a tune for the audio asset; and
   in response to determining that the metadata includes no information relating to any theme song, performing audio analysis of the content to generate the plurality of music tunes.

5. A method for identifying a media asset, the method comprising:
   capturing, from an environment where a user is present, an audio recording;
   retrieving information about a user's location including retrieving, from a profile of the user, a location history of the user and an application usage history corresponding to the user;
   identifying a source of media available at the user's location;
   determining content accessible from the source of media;
   comparing the audio recording to the content to identify the media asset having a characteristic associated with the audio recording;
   upon determining a match between the audio recording and the content, generating for display a recommendation of the media asset;
   searching the application usage history for one or more application usage records corresponding to when the user was present at the user's location; and
   in response to identifying the one or more application usage records:
      determining an application type, an application usage status and an application usage time duration for each of the one or more application usage records;
      searching, an application usage table, for a distraction score corresponding to each application type;
      computing a distraction metric based on the distraction score corresponding to each application type, the respective application usage status and the respective application usage time duration; and
      in response to determining that the distraction metric is higher than a distraction threshold, determining that the user was not exposed to the retrieved content.

6. The method of claim 5, wherein the retrieving, from the profile of the user, the location history of the user and the application usage history comprises:

transmitting a query to a device of the user for a GPS log and an application usage log;

in response to the query, obtaining the GPS log from the device of the user;

in response to receiving a notification that the GPS log is unavailable, transmitting, to a server, a query for a record of social media activities relating to the user;

in response to the query for the record of social media activities, searching the record of social media activities relating to the user for a first subset of social media activities, each social media activity from the subset identifying a location; and storing the first subset of social media activities and corresponding locations as part of the location history.

7. The method of claim 6, further comprising:

in response to receiving a notification that the application usage history is unavailable from the device of the user:

searching the record of social media activities relating to the user for a second subset of social media activities, each social media activity from the second subset indicates that the user is using a respective application; and storing the second subset of social media activities and information relating to respective applications as part of the application usage history.

8. A system for identifying a media asset, the system comprising:

a storage device; and control circuitry configured to:

capture, from an environment where a user is present, an audio recording;

retrieve information about a user's location;

identify a source of media available at the user's location;

determine content accessible from the source of media;

compare the audio recording to the content to identify the media asset having a characteristic associated with the audio recording by:

determining a plurality of music tunes transmitted with the content;

comparing the frequency domain representation of the plurality of tones with each music tune of the plurality of music tunes to generate a respective similarity metric; and in response to determining that the respective similarity metric is greater than a similarity threshold, identifying a respective music tune from the media asset corresponds to the audio recording provided by the user;

upon determining a match between the audio recording and the content, generate for display a recommendation of the media asset;

identify, from the audio recording, a tune having audio characteristics that match with vocal characteristics of the user, wherein the tune includes a plurality of tones;

in response to identifying the tune, generate a frequency domain representation of the plurality of tones; and transmit a query based on the generated frequency domain representation to a music database.

9. The system of claim 8, wherein the control circuitry is further configured to:

receive a result indicating a failure to find a match in the music database based on the generated frequency domain representation.

10. The system of claim 8, wherein the control circuitry, when identifying, from the audio recording, the tune having audio characteristics that match with vocal characteristics of the user, further configured to:

extract a set of mono signals from the audio recording;

for each mono signal from the set of mono signals:

generate a set of audio characteristics corresponding to the mono signal, wherein the set of audio characteristics includes any of mel-frequency cepstral coefficients (MFCC) and perceptual linear prediction relative spectra (PLP-RASTA);

retrieve, from a profile of the user, a set of vocal characteristics;

compare each characteristic of the set of audio characteristics with a corresponding characteristic from the set of vocal characteristics that has a same type;

determine whether the set of audio characteristics and the set of vocal characteristics overlap for more than a similarity threshold; and in response to determining that the set of audio characteristics and the set of vocal characteristics overlap for more than the similarity threshold, identify the mono signal as a vocal signal from the user.

11. The system of claim 8, wherein the control circuitry, when determining the plurality of music tunes transmitted with the content of the first media asset, further configured to:

retrieve metadata associated with the content;

in response to determining that the metadata includes information relating to a theme song:

transmit a query to the music database based on a title of the theme song; and in response to the query, obtain an audio asset of the theme song and generating a tune for the audio asset; and in response to determining that the metadata includes no information relating to any theme song, perform audio analysis of the content to generate the plurality of music tunes.

12. A system for identifying a media asset, the system comprising:

a storage device; and control circuitry configured to:

capture, from an environment where a user is present, an audio recording;

retrieve information about a user's location including retrieving, from a profile of the user, a location history of the user and an application usage history corresponding to the user;

identify a source of media available at the user's location;

determine content accessible from the source of media;

compare the audio recording to the content to identify the media asset having a characteristic associated with the audio recording; and upon determining a match between the audio recording and the content, generate for display a recommendation of the media asset;

search the application usage history for one or more application usage records corresponding to when the user was present at the user's location; and in response to identifying the one or more application usage records:

determine an application type, an application usage status and an application usage time duration for each of the one or more application usage records;

search, an application usage table, for a distraction score corresponding to each application type;

compute a distraction metric based on the distraction score corresponding to each application type, the respective application usage status and the respective application usage time duration; and in response to determining that the distraction metric is higher than a distraction threshold, determine that the user was not exposed to the retrieved content.

13. The system of claim 12, wherein the retrieving, from the profile of the user, the location history of the user and the application usage history comprises:

transmit a query to a device of the user for a GPS log and an application usage log;

in response to the query, obtain the GPS log from the device of the user;

in response to receiving a notification that the GPS log is unavailable, transmit, to a server, a query for a record of social media activities relating to the user;

in response to the query for the record of social media activities, search the record of social media activities relating to the user for a first subset of social media activities, each social media activity from the subset identifying a location; and store the first subset of social media activities and corresponding locations as part of the location history.

14. The system of claim 13, wherein the control circuitry is further configured to:

in response to receive a notification that the application usage history is unavailable from the device of the user:

search the record of social media activities relating to the user for a second subset of social media activities, each social media activity from the second subset indicates that the user is using a respective application; and store the second subset of social media activities and information relating to respective applications as part of the application usage history.

* * * * *